Dec. 28, 1943.                R. COULSON                2,337,591
                     AUTOMATIC CHAIN TENSIONING DEVICE
                        Filed July 21, 1942         2 Sheets-Sheet 1
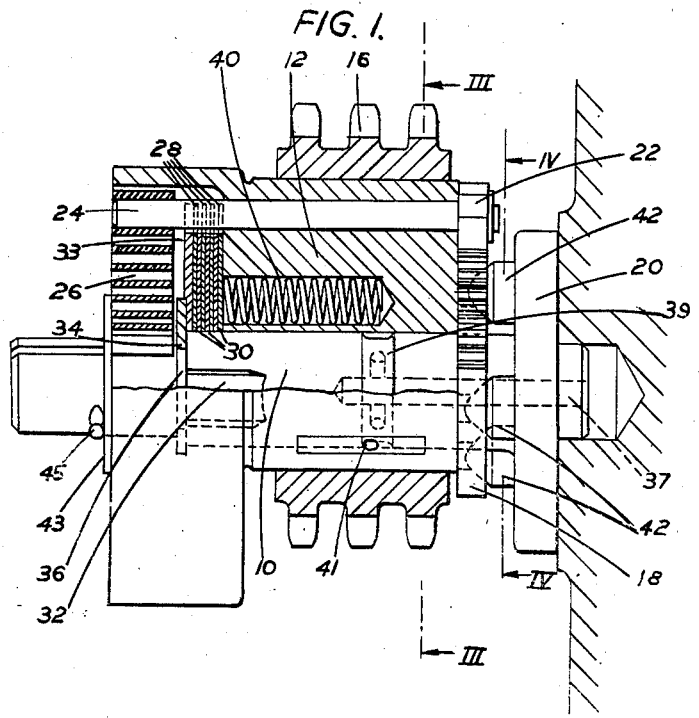
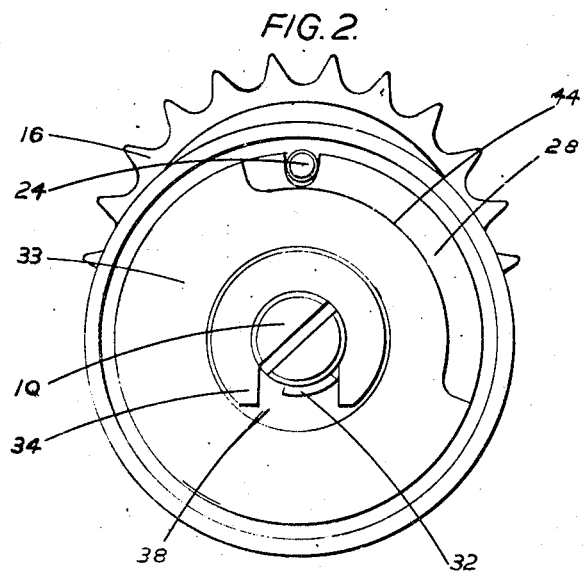
INVENTOR
R. COULSON.
BY Blair Kilcoyne
ATTORNEYS Dec. 28, 1943.   R. COULSON   2,337,591
AUTOMATIC CHAIN TENSIONING DEVICE
Filed July 21, 1942   2 Sheets-Sheet 2

INVENTOR
R. COULSON.
BY Blair Kilcoyne
ATTORNEYS.

Patented Dec. 28, 1943

2,337,591

UNITED STATES PATENT OFFICE 2,337,591

AUTOMATIC CHAIN TENSIONING DEVICE

Richard Coulson, Didsbury, Manchester, England, assignor to The Renold and Coventry Chain Company Limited, Didsbury, Manchester, England, a British company Application July 21, 1942, Serial No. 451,794
In Great Britain September 2, 1941

9 Claims. (Cl. 74—242.16)

This invention relates to automatic chain tensioning devices of the kind in which a driving chain passes around a pinion which rotates on a boss or hub mounted eccentrically on a spindle, while a spring urges the eccentric hub in the direction to apply tension to the chain, and a non-return device such as a ratchet and pawl limits reverse movement of the tensioner.

When automatic chain tensioning devices of this kind are applied to certain uses such for example as the drive of the timing mechanism of internal combustion engines of the compression-ignition type, trouble arises through oscillation or flutter of the tensioner which is liable to take place within the limits of movement permitted by the ratchet device between one ratchet tooth and the next, or by any lost-motion device that may be provided. It is the principal object of the present invention to overcome this difficulty, and for this purpose the tensioning device is provided with a frictional damper which opposes undesired movements. The damping device for example may be a multiplate brake acting between the eccentric hub and the spindle on which it is mounted, and means may be provided for increasing the pressure applied to the plates of the brake consequent upon small relative movements between the ratchet member and its mounting.

Referring to the accompanying drawings,

Figure 1 is a side elevation partly in section of a chain tensioner according to this invention;

Figure 2 is an end elevation as seen from the left in Figure 1 with parts removed;

Figure 4:
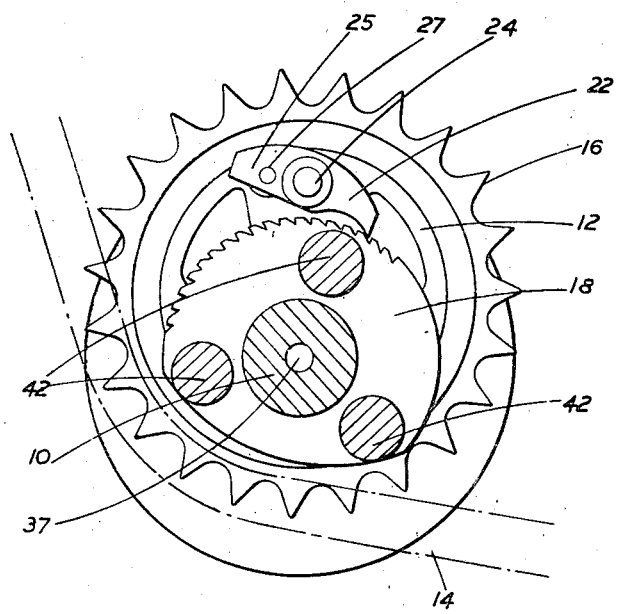
Figure 4 is an end elevation in section on the line IV—IV in Figure 1 looking in the direction of the arrows.

A spindle 10 is provided on which the eccentric hub 12 is mounted and the chain 14 passes round a chain wheel 16 rotating freely on the eccentric hub. A ratchet 18 is disposed on the mounting 20 which carries the spindle, and a pawl 22 is provided on the hub 12 engaging with the ratchet teeth. The pawl is mounted on a pin 24 which extends through the hub 12 and which serves as an anchorage for one end of a coil spring 26 the other end of which is attached to the spindle 10, the spring being arranged to turn the hub so as to increase the tension of the chain—that is to say, clockwise as seen in Figure 2, anticlockwise as seen in Figure 4. The pawl engaging with the ratchet prevents return movement of the eccentric hub.

Figure 3:
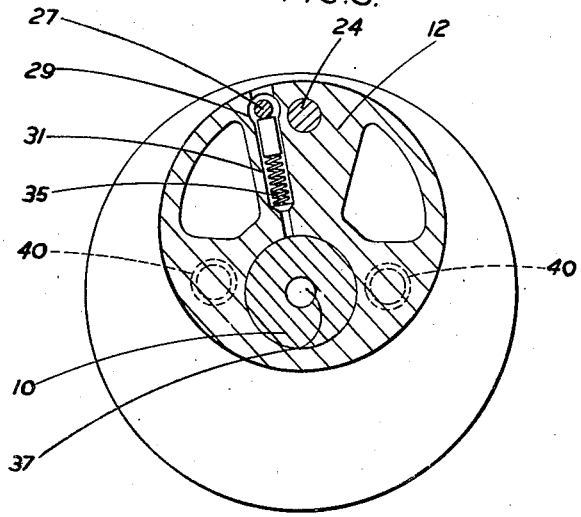
Figure 3 is an end elevation in section on the line III—III in Figure 1 looking in the direction of the arrows.

A multi-plate brake is arranged in a space between the end of the eccentric hub 12 and the spring 26, alternate plates 28 being notched to engage the pin 24 carrying the pawl, while the intervening plates 30 are formed with key projections engaging in a keyway 32 in the spindle 10. The outermost plate 33 is held on the spindle by a U-shaped washer or clip 34 engaging with a recess 36 turned in the spindle and lying in a shallow depression 38 in the plate 33. Two springs 40 in recesses in the eccentric hub serve to press the plates together. One of these springs is shown in Figure 1 though not in its correct position; they are actually located as shown in Figure 3.

The multi-plate brake as described above opposes a certain amount of resistance to relative movement between the eccentric hub and the spindle and so acts as a damper preventing unrestricted movements although permitting the eccentric hub to be turned under the action of the spring 26 when the slack due to wear in the chain and sprockets is such that automatic take-up is desirable.

It is desirable to provide for an automatic increase in the damping action when the eccentric hub moves in the direction tending to relieve tension in the chain, and this result is attained in a simple manner by mounting the ratchet 18 so that it has a small amount of rotary movement upon its support, while providing that this rotary movement increases the pressure on the multi-plate brake which acts as the damper. For this purpose, the ratchet is formed with three conical recesses engaging the conical ends of pegs 42 secured to the amount 20, these conical ends acting as cams. Then when the ratchet tends to move backwards (clockwise in Figure 4) under the action of the pawl 22 the conical surfaces impart endwise axial movement to the ratchet. This movement is imparted by the ratchet member to the eccentric hub 12, causing it to move to the left as seen in Figure 1 to press the plates 28, 30 together. The parts may be arranged so that there is normally a little clearance between the innermost plate 28, which engages with the pin 24, and the adjacent face of the eccentric hub, the springs 40 being strong enough to keep the plates pressed away from the face of the hub to a small extent. The relative movement between the ratchet and the cone-headed pegs 42 takes up this clearance and applies increased pressure to the damper which assists in damping out any tendency to undesired movements of the chain tensioner.

The chain wheel 12 is mounted freely on the eccentric hub so that it can float laterally thereon within limits and it will not be affected by the slight displacement of the eccentric hub in applying additional pressure to the damper. Instead of cone-headed pegs, any other device capable of converting partial rotational movement of the ratchet into endwise movement can be used. The rotational movement of the eccentric within the limits indicated above, before the increased pressure is applied to the clutch, is in the nature of a lost motion, providing a safeguard against excessive tensioning of the chain after the pawl has dropped behind one of the ratchet teeth, in case such excessive tensioning should occur due to differential expansion or contraction effects between the chain and the parts on which it is mounted, or for any other reason. The outermost plate 33 of the damper, which is splined to engage with the spindle, is cut away at its edge to clear the pin 24, as indicated at 44, the circumferential extent of the portion removed being such as to limit the angle through which the hub 12 can turn on the spindle 10. In the example illustrated this angle is 120 degrees. The manner in which the plate 33 cooperates with the pin 24 is shown in Figure 2, from which the spring 26 has been omitted for clearness.

It is convenient to provide the pawl with a tailpiece 25 which projects beyond the periphery of the hub so that during assembly the chain wheel can be made to hold the pawl out of engagement with the ratchet. The pawl is rocked manually to make the tailpiece engage beneath the chain wheel and then the eccentric hub can be slid into position without the necessity for holding the pawl by hand, which would otherwise have to be done in order to enable it to clear the side of the ratchet plate.

Attached to the tail-piece is a pin 27 which projects into a hole 29 in the eccentric hub— see Figure 3. A bore 31 houses a spring 35 which presses against the pin 27 thereby maintaining the pawl 22 yieldingly in engagement with the ratchet teeth.

A forced oil feed for lubrication purposes may be provided through a longitudinal hole 37 in the spindle communicating with a groove 39 in the spindle 10 inside the eccentric hub, while there is a radial passage 41 in the hub which conveys oil from this recess to the bore of the chain wheel. The oil also lubricates the bearing surfaces between the eccentric hub and the spindle, and oil passing out laterally from this bearing lubricates the damper. Reverse movement of the eccentric hub is cushioned and finally checked completely by the resistance to compression of the assembly of damper plates and the oil films between them. This is an important advantage, since it eliminates the shock which would otherwise occur, due to the impact of unlubricated metal or metal surfaces of relatively small area.

The main spring 26, which maintains the chain tension, is mounted on the spindle so that it can be wound to give the desired tension, and may then be secured in position, for example by a washer 43 held in place by a split pin 45 extending through a hole in the spindle.

I claim:

1. An automatic chain tensioner comprising a stationary spindle, an eccentric hub mounted to turn on said spindle, a chain wheel carried by said hub, spring means urging said hub to turn to apply tension to a chain passing around said chain wheel, a ratchet and pawl mechanism for limiting reverse movement of said hub, and a friction damper directly interposed between said hub and said spindle and operative to damp all movements of said hub.

2. An automatic chain tensioner according to claim 1 wherein the frictional damper is of the plate type consisting of a plurality of plates constrained to rotate with said eccentric hub, said plates being interleaved with plates mounted on said spindle.

3. An automatic chain tensioner comprising a stationary spindle, an eccentric hub mounted to turn on said spindle, a chain wheel carried by said hub, spring means urging said hub to turn to apply tension to a chain passing around said chain wheel, a pawl carried by said hub, a ratchet surrounding said spindle and free to rotate relatively thereto within narrow limits, said ratchet and pawl cooperating to limit reverse movement of said hub to within narrow limits, and a friction damper directly interposed between said hub and said spindle and operative to damp all movements of said hub.

4. An automatic chain tensioner comprising a stationary spindle, an eccentric hub mounted to turn on said spindle, a chain wheel carried by said hub, spring means urging said hub to turn to apply tension to a chain passing around said chain wheel, a pawl carried by said hub, a ratchet surrounding said spindle, said ratchet and pawl cooperating to limit reverse movement of said hub, a friction damper interposed between said hub and said spindle, and cam means operative when said ratchet is rotated in the reverse direction by said pawl to increase the frictional resistance of said damper.

5. An automatic chain tensioner comprising a stationary spindle, an eccentric hub mounted to turn on said spindle and free to move axially thereon, a chain wheel carried by said hub, spring means urging said hub to turn to apply tension to a chain passing around said chain wheel, a pawl carried by said hub, a ratchet surrounding said spindle and free to rotate relatively thereto within narrow limits, said ratchet and pawl cooperating to limit reverse movement of said hub to within narrow limits, a friction damper of the interleaved plate type directly interposed between said hub and said spindle and operative to damp all movements of said hub, and cam means operative upon rotation of said ratchet under the action of said pawl to displace said hub axially and thereby to increase the pressure upon said plates.

6. An automatic chain tensioner comprising a stationary spindle, an eccentric hub mounted to turn on said spindle and free to move axially thereon, a chain wheel carried by said hub, spring means urging said hub to turn to apply tension to a chain passing around said chain wheel, a pawl carried by said hub, a ratchet surrounding said spindle and free to rotate relatively thereto within narrow limits, said ratchet and pawl cooperating to limit reverse movement of said hub to within narrow limits, a friction damper of the interleaved plate type interposed between the end face of said hub remote from said ratchet and an abutment carried by said spindle, and cam means operative upon rotation of said ratchet under the action of said pawl to displace said hub axially and thereby to increase the pressure upon said plates.

7. An automatic chain tensioner according to claim 6 wherein springs are interposed between the damper plates and the eccentric hub and wherein a clearance is provided between the end face of said eccentric hub and the damper plate next to it whereby an initial rotation of the ratchet may take place without the exertion of additional pressure upon the damper plates.

8. An automatic chain tensioner comprising a stationary spindle, an eccentric hub mounted to turn on said spindle, a chain wheel carried by said hub, spring means urging said hub to turn to apply tension to a chain passing around said chain wheel, a pawl carried by said hub, a ratchet surrounding said spindle and free to rotate relatively thereto within narrow limits, said ratchet and pawl cooperating to limit reverse movement of said hub to within narrow limits, a friction damper of the interleaved plate type directly interposed between said hub and said spindle and operative to damp all movements of said hub, and a pin fixed in said hub to protrude therefrom at both ends and constituting a pivot for said pawl, an anchorage for one set of damper plates and an anchorage for said spring means.

9. An automatic chain tensioner comprising a stationary spindle, an eccentric hub mounted to turn on said spindle, a chain wheel carried by said hub, spring means urging said hub to turn to apply tension to a chain passing around said chain wheel, a friction damper directly interposed between said hub and said spindle and operative to damp all movements of said hub, a pawl carried by said hub and having a tailpiece projecting beyond the periphery of said hub, a ratchet surrounding said spindle and free to rotate relatively thereto within narrow limits, said ratchet and pawl cooperating to limit reverse movement of said hub to within narrow limits, and said chain wheel being adapted during assembly to engage said tailpiece and hold said pawl out of engagement with said ratchet.

RICHARD COULSON.